United States Patent [19]
Yew

[11] 3,768,820
[45] Oct. 30, 1973

[54] VEHICLE LEVELING CONTROL WITH VACUUM REGULATOR VALVE MEANS

[75] Inventor: Ming-Chih Yew, Sterling Heights, Mich.

[73] Assignee: General Motors Corporation, Detroit, Mich.

[22] Filed: June 15, 1972

[21] Appl. No.: 262,952

[52] U.S. Cl............ 280/6 R, 280/124 F, 267/64 R, 137/627.5
[51] Int. Cl............................................. B60g 9/00
[58] Field of Search..................... 280/6 R, 6 H, 6.1, 280/6.11, DIG. 1, 124 F; 267/64 R, 65 R; 137/622.5

[56] References Cited
UNITED STATES PATENTS

| | | | |
|---|---|---|---|
| 3,285,617 | 11/1966 | Jackson | 280/6 R |
| 3,527,467 | 9/1970 | Scott et al. | 280/6 R |
| 3,510,143 | 5/1970 | Carpenter | 280/6 R |
| 3,054,425 | 9/1962 | Pribonic | 280/124 F |
| 3,232,306 | 1/1966 | Miller et al. | 280/124 F |
| 2,985,192 | 5/1961 | Taylor et al. | 137/627.5 |

Primary Examiner—Philip Goodman
Assistant Examiner—John A. Carroll
Attorney—W. S. Pettigrew et al.

[57] ABSTRACT

A vehicle leveling system including a pair of rear suspension springs each surrounded by a gas tight sleeve which is connected to a conduit. An air conduit and a vacuum conduit are selectively communicated to the conduit by means of a pair of spaced apart spring bands selectively moved to open and close the lines to maintain a vacuum leveling unit pressure which will contract the spring to add a simulated load thereon to produce a desired standing height relationship between the front and rear end of the vehicle. A maximum vacuum pressure regulator valve is located between the vacuum source and the vacuum line to control the simulated load when the vehicle is at a curb load.

6 Claims, 5 Drawing Figures

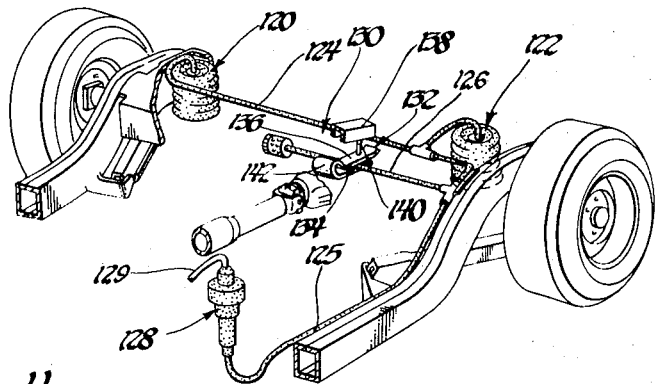

Fig. 4

| LOADING | VEHICLE REFERENCE LINE | | |
| --- | --- | --- | --- |
| | ΔH=ΔF-ΔR FRONT | ΔH | REAR |
| CURB | ΔF= 0" | ΔH=0 | ΔR= 0" |
| 1 PERSON-FRONT | ΔF=-.28" | ΔH=0 | ΔR=-.28" |
| 2 PERSONS-FRONT | ΔF=-.56" | ΔH=0 | ΔR=-.56" |
| 2 PERSONS-FRONT / 1 PERSON-REAR | ΔF=-.69" | ΔH=.15 | ΔR=-.84" |
| 2 PERSONS-FRONT / 2 PERSONS-REAR | ΔF=-.83" | ΔH=.01 | ΔR=-.84" |
| 2 PERSONS-FRONT / 3 PERSONS-REAR | ΔF=-.96" | ΔH=-.12 | ΔR=-.84" |
| 2 PERSONS-FRONT / 200 LB.-TRUNK | ΔF=-.35" | ΔH=.49 | ΔR=-.84" |
| 2 PERSONS-FRONT / 2 PERSONS-REAR / 200 LB.-TRUNK | ΔF=-.61" | ΔH=.23 | ΔR=-.84" |
| 2 PERSONS-FRONT / 3 PERSONS-REAR / 200 LB.-TRUNK | ΔF=-.75" | ΔH=.09 | ΔR=-.84" |
| 3 PERSONS-FRONT / 3 PERSONS-REAR / 200 LB.-TRUNK | ΔF=-1.03" | ΔH=-.19 | ΔR=-.84" |
| S.A.E. HEADLIGHT AIMING STANDARDS | ΔF=-.847" / ΔF= 0" | ΔH MAX=.847 / ΔH MAX=-.847 | ΔR= 0" / ΔR=-.847" |

Fig. 5

VEHICLE LEVELING CONTROL WITH VACUUM REGULATOR VALVE MEANS

This invention relates to automatic vehicle leveling systems and more particularly to those including a load leveler having a variable volume pressurizable chamber therein connected to a pressure source by means of a height responsive control valve which controls the variable volume chamber pressure in accordance with vehicle height.

In vehicle leveling systems it is relatively simple to maintain the vehicle level when the vehicle is equipped with leveling units at both the front and rear suspension of a vehicle.

It is desirable, however, to reduce the number of vehicle leveler units in the system. For this reason, leveling systems have been proposed wherein the leveler units are found only at the rear suspension. In these types of systems it is more difficult to obtain a constant level configuration between the front and rear of a vehicle.

Accordingly, an object of the present invention is to provide a vehicle leveling control system that will maintain a conventional passenger vehicle leveled or almost leveled without requiring means for sensing the height relationship between the sprung and unsprung mass at both the rear and front of the vehicle.

Another object of the present invention is to provide an improved vehicle leveling system having vacuum leveling units only in the rear suspension of the vehicle controlled by means for maintaining a simulated load on main suspension springs of the leveler units to produce a level relationship between the front and rear of the vehicle.

Another object of the present invention is to provide a vehicle leveling system having leveler units at the rear only including springs loaded by vacuum leveling sleeves to maintain a vehicle leveled or almost level under various load conditions and including a control arrangement that controls only when there is a significant standing height deviation between the front and rear end of the vehicle.

Yet another object of the present invention is to provide an improved vehicle height control system including a pair of rear coil springs each having an air tight sleeve with convolutions formed around the coils of the springs to add a simulated load to the spring by vacuum. A maximum vacuum level regulating valve controls vacuum flow to the sleeves to maintain the simulated load on the springs by vacuum when the vehicle is at curb load. An air valve controls flow of air into the sleeve to reduce the simulated load only when a predetermined load is added to the vehicle which will produce a significant standing height deviation between the front and rear end of the vehicle.

Still another object of the present invention is to provide an improved arrangement for controlling pressure in a variable volume chamber of a leveler device adapted to be connected between the sprung and unsprung mass of a vehicle including a supply conduit to and from the leveler unit chamber interconnected with first and second resilient tubes selectively opened and closed by a pair of spaced parallel spring bands, each of which are moved with respect to one another in accordance with the height relationship between the sprung and unsprung mass of the vehicle.

Still another object of the present invention is to provide an improved air valve control mechanism having a resilient tube pinched by a flexible lever having one end thereon contacting the unsprung mass of a vehicle, the flexible lever gradually releasing the tube to admit air into spring chambers when the rear end of a vehicle stands lower than a preset level.

Further objects and advantages of the present invention will be apparent from the following description, reference being had to the accompanying drawings wherein a preferred embodiment of the present invention is clearly shown.

In the drawings:

FIG. 4 is a diagrammatic view of a second embodiment of a control system for leveling a vehicle; and FIG. 5 is a diagram showing the leveling action of the proposed system in FIG. 1.

Figure 1:
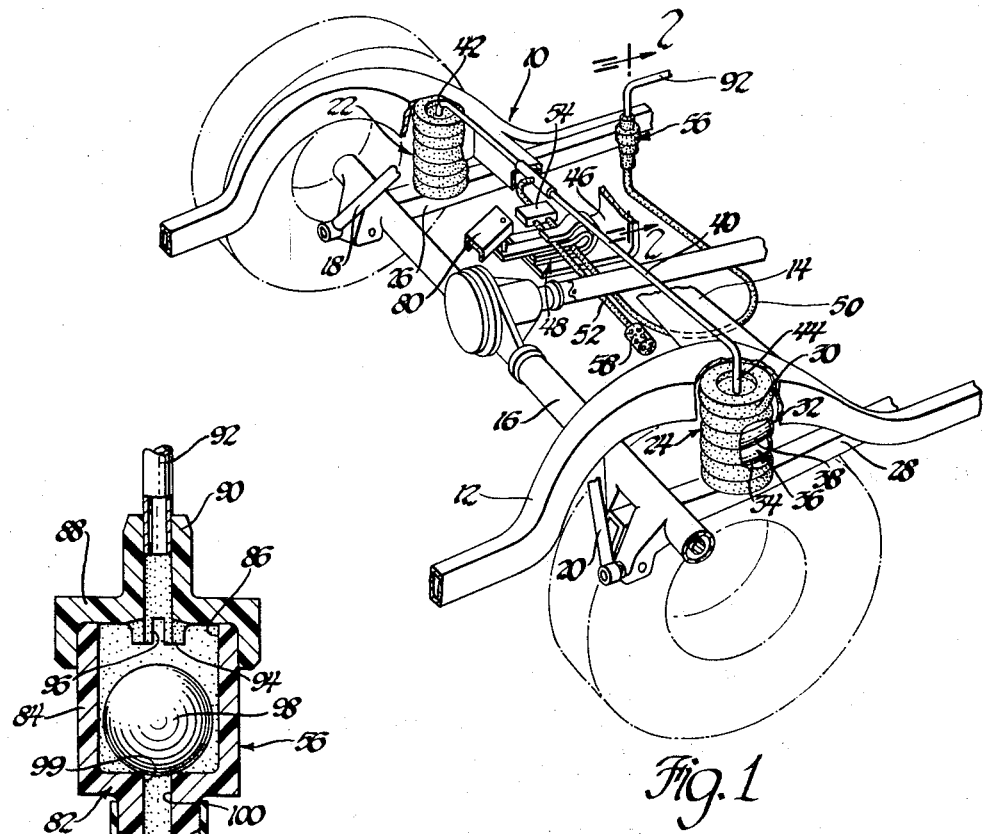
FIG. 1 is a view in perspective showing a broken away portion of a rear suspension of a vehicle including the present invention.

Referring now to the drawings, FIG. 1 shows a rear suspension 10 of a vehicle having a sprung frame 12 including a cross arm 14 thereon.

The sprung frame 12 is suspended over a rear axle housing 16 adapted to be connected at the opposite ends thereof to ground engaging wheel and tire assemblies.

The axle housing 16 has a pair of shock absorbers 18, 20 connected thereto. The shock absorbers 18, 20 have upper end portions thereof adapted to be connected to brackets (not shown) on the sprung frame 12.

The sprung frame 12 more particularly is supported on a pair of fluid pressure operator or vacuum leveling units 22, 24. The leveler units 22, 24 are connected at the base thereof on control arms 26, 28, respectively. Each of the control arms 26, 28 is pivoted by suitable means at one end thereof to the axle housing 16 and at the opposite ends thereof to the sprung frame 12.

Each of the upper ends of units 22, 24 are supported by suitable means on the sprung frame 12 whereby the leveler units 22, 24 will determine the height relationship between the frame 12 and the unsprung mass portions represented by the control arms 26, 28 and the axle housing 16. This in turn will establish the relationship between the front and rear end of the vehicle.

Each of the leveler units more particularly includes an air tight vacuum bellows sleeve 30 with convolutions 32 formed around coils 34 of a main suspension spring 36 which is adapted to support the sprung weight of the vehicle.

The air tight sleeve 30 forms a sealed, variable volume pressurizable control chamber 38 in each of the leveler units 22, 24 connected to a supply and exhaust conduit 40 which has elbows 42, 44 thereon connected to fittings on the top of the leveler units 22, 24, respectively.

A bracket 46 depending from the cross arm 14 supports a dual function air control valve 48 which is height responsive as will be discussed. The valve operates to control flow through an air conduit 50 and a vacuum conduit 52. The vacuum conduit 52 has one end thereof connected to a fitting 54 which in turn is connected to the conduit 40. The opposite end of the vacuum conduit 52 is connected to a maximum vacuum level regulating valve 56 which in turn is connected to a suitable vacuum source on the vehicle such as the intake manifold thereof.

Likewise, air conduit 50 has one end thereof connected to the fitting 54 thence to the conduit 40. The opposite end thereof is connected to an air filter 58.

Figure 3:
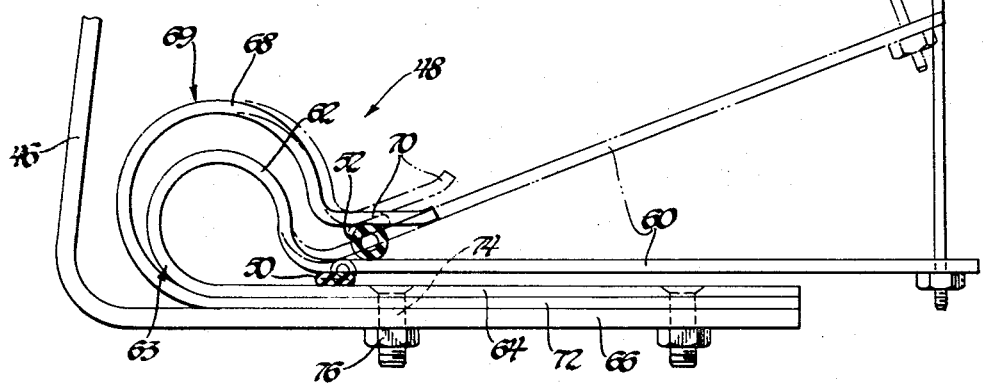
FIG. 3 is an enlarged fragmentary view of a dual function air valve in the system of FIG. 1.

Referring now to FIG. 3, the dual function air valve 48 is more particularly illustrated as including a flexible lever 60 formed as an extension on one end of a loop 62 in a spring band 63. Band 63 has a base portion 64 thereon located in spaced parallelism with base 66 of the bracket 46.

The loop 62 is located inwardly of a second loop 68 in an outer spring band 69 that includes a terminal end 70 thereon located above the lever 60 and a leg portion 72 which is interposed between the base or leg portion 64 of the band 63 and the base 66. The leg portions 64, 72 are both fixedly secured to the base 66 by suitable means illustrated as bolts 74 with countersunk heads. Nuts 76 threaded on bolts 74 are fimrly seated against the base 66 to hold the leg portions 64, 72 together and against base 66.

In the illustrated arrangement, the vacuum conduit 52 is shown in solid lines in FIG. 3 at a point between the terminal end 70 of the band 69 and the flexible lever 60 at the point at which it connects to the loop 62.

The air conduit 50 is located between the flexible lever 60 and the leg portion 64 of the inner spring band 63 and is shown in solid line closed position in FIG. 3.

The distal end of a flexible lever 60 is connected to one end of a link 78 which has the opposite end thereof connected to a portion of an upper control arm 80 which forms part of the unsprung mass of the vehicle. Any other part connected to the unsprung mass at the correct standing height relationship would also be suitable for a point of connection of the link 78 to the unsprung mass.

Figure 2:
FIG. 2 is an enlarged sectional view through lines 2—2 of FIG. 1 looking in the direction of the arrows.

Referring now to FIG. 2, the maximum vacuum level regulating valve 56 has a rigid valve body 82 with an enlarged diameter head 84 thereon having a bore 86 therethrough. The bore forms an open end in the head 84 which is closed by a cap 88 having the peripheral flange thereon fastened over the outer periphery of the head 84. The cap 88 has an outer extension 90 located centrally thereof which is adapted to be connected to a conduit 92 for communicating the bore 86 with a suitable source of vacuum. The extension 90 is formed inwardly of the cap 88 to define a ball check limit stop 94. It has a plurality of circumferentially located slots 96 thereon to maintain communication between the bore 86 and the conduit 92 when a ball check valve element 98 is in engagement with the stop 94.

The ball check valve element 98 also is seated against an annular seat 99 around an elongated opening 100 through an extension 102 depending from the head 84 of the housing 82. The extension 102 has a peripheral groove 104 formed therein which is enclosed by a flexible seal member 106 having one end thereof located in sealed engagement with the extension 102 immediately below the head 84 and the opposite end thereof sealed against the extension 102 at a point where an end 108 thereon with a reduced diameter extends. The end 108 has an axial opening 110 therein which is adapted to receive one end of the vacuum conduit 52. The axial opening 110 is in communication with a first opening 112 extending transversely through the extension 102 at the groove 104 thereon. The transverse opening 112 defines side outlets in communication with a chamber 114 formed between the sleeve 106 and the extension 102. It is separated by a land 116 from a second opening 118 also formed transversely through the extension 102 to have the opposite ends thereof open to the chamber 114. The bore 86 within the head 84 is communicated with the opening 118 through the opening 100.

In accordance with certain principles of the present invention, this system utilizes vacuum leveling to maintain a combined actual and simulated load at a constant level as is illustrated in the chart of FIG. 5.

The principle is one of optimum control to maintain the vehicle leveled between the front and rear thereof or almost leveled under various load conditions with leveling units at the rear suspension only. It is accomplished by exercising control only when there is a significant standing height deviation between the front and rear end of the vehicle. The system does not however depend upon any front and rear standing height sensing or comparison mechanism to establish a true level pitch relationship between the front and rear of the vehicle. It is accomplished simply by utilizing means that take advantage of the standing height variation characteristic of a particular vehicle in question and then providing the correction to maintain a desired height relationship at the rear of the vehicle.

For example, there are full size American vehicles that have a suspension which supports the front and rear end of the vehicle to produce a deflection which is almost even for a first three passenger load; namely, with two passengers in the front and one in the rear.

With this arrangement, the system leveling units 22, 24 are only operated when the vehicle load is greater than a standard three passenger load. During this phase of operation, the maximum vacuum regulating valve 56 maintains a present maximum vacuum within the leveler units 22, 24 to impose a holddown force on the coil springs 34 of each of the leveler units 22, 24. This is a simulated load on the spring produced by vacuum. The valve 56 first functions to allow air to bleed from each of the leveler units 22, 24 through the conduit 40 thence to the vacuum line 52 and the regulator 56 to the intake manifold of the vehicle. Following a predetermined period of drawdown after the vehicle is first operated, the vacuum level within the variable volume control chambers 38 of each of the leveler units 22, 24 will reach a predetermined maximum level. At this point the flexible sleeve 106 of the valve 56 will be forced by surrounding ambient pressure against the open ends of the spaced passageways 112, 118. As a result, the pressure level within the control chambers of the leveler units 22, 24 is trapped therein by the valving action of the sleeve 106. The atmospheric pressure surrounding each of the leveler units 22, 24 will produce a resultant force to draw down each of the coil springs 36 to a reduced height relationship. This simulates a load which along with the first three passenger load will maintain a desired height relationship between the front and rear of the vehicle only by means of a pair of leveler units 22, 24 at the rear of the vehicle.

The pressurizable chambers 38 of the leveler units 22, 24 are also connected to atmosphere through the air valve 48. When the vehicle level stands at or above the correct standing height relationship between the sprung and unsprung mass of the vehicle, the air tube 50 is pinched by the flexible lever 60 as illustrated in FIG. 3 to maintain the simulated load within the leveler units 22, 24.

At a curb load the springs 36 are designed to make the rear sprung frame 12 stand a few inches higher than the front without any vacuum. The maximum vacuum will correct this attitude so as to make the vehicle start with a level attitude at curb load conditions when the vacuum source is connected as described above.

In one working embodiment, the vehicle was a 1971 Oldsmobile 98. In this vehicle the suspension springs were designed so that the rear end of the vehicle stands about 2.5 inches higher than the front end under curb load and 0 inches Hg of vacuum in chambers 38. When the engine of the car is operated, the intake manifold constitutes a vacuum source. It will activate the spring chambers 38 to a vacuum level set by the maximum vacuum regulating valve 56. With the driver alone, the front end will lower by an amount of 0.28 inch as shown in FIG. 5, the rear will lower by 0.28 inches. With two persons in front, the front will lower by 0.56 inches and the rear by 0.56 inches. With two persons in front and one in the rear, the front will lower by 0.69 inch and the rear by 0.484 inch. During this period, the vehicle is essentially level from front to rear thereof. The air valve 48 is closed until the rear standing height is reached. At this point, any additional load put on the vehicle will cause the sprung mass 12 to move slightly below the desired preset rear standing height and air will be directed through the conduit 50 to compensate for this load by reducing the simulated load on the leveler units 22, 24. The air bleed into the chambers 38 of the leveler units 22, 24 will continue up to a predetermined maximum load.

More particularly, during this phase of operation the air control valve 48 assumes the position shown in dotted lines in FIG. 3. Under these conditions, the flexible lever 60 will pinch the vacuum conduit 52 into a closed position between the terminal end 70 of the band 69. At the same time it will move away from the air conduit 50 to allow it to assume a fully round position wherein air will flow through the filter 58, through conduit 50, thence through conduit 40 and then to each of the variable volume pressure chambers to increase the pressure therein an amount to compensate for the additional load. This will result in maintenance of the desired pitch relationship between the front and rear of the vehicle as shown in FIG. 5. During the period where air is directed into the leveler units 22, 24 to reduce the simulated load thereon, the vacuum conduit is disconnected.

As noted in FIG. 5, with the optimum type of control provided by the aforedescribed system, the maximum deviation between front and rear standing height measures only 0.49 inch and the maximum vacuum requirements are only 16 inches of mercury for a 7 inch OD coil spring. The system thus will compensate for additional load with only a slight deviation between the front and rear of the vehicle and it will do so with a minimum use of vacuum.

Another embodiment of the invention is illustrated in FIG. 4. It includes a pair of rear leveler units 120, 122 corresponding to units 22, 24 in the first embodiment. Units 120, 122 connect to a supply and exhaust conduit 124 which is connected to an air bleed conduit 125 and an air supply conduit 126.

The system has a maximum vacuum regulator valve 128 in conduit 126 to a source of vacuum. It serves the same purpose as valve 56 in the embodiment of FIGS. 1–3.

The embodiment of FIG. 4 has a single function air valve 130 in place of the dual function valve 48 of the first embodiment. The valve 130 includes a spring band 132 with a leg 134 connected to a portion of the spring frame. A flexible lever 136 thereon is connected to an upper control arm 138 by a link 140.

At designed height relationships between the sprung and unsprung mass the lever 136 is biased by a band loop 142 toward the leg 134. The air supply conduit 126 is pinched closed to prevent atmospheric pressure air entry into units 120, 122.

This continues until the vehicle suspension assumes a predetermined deviation from level, front to rear end. At this point the lever 136 is moved away from conduit 126. Air flows into units 120, 122 to reduce the vacuum simulated load thereon. The vacuum line remains open to slightly reduce time required to level the vehicle.

While the embodiments of the present invention, as herein disclosed, constitute a preferred form, it is to be understood that other forms might be adopted.

What is claimed is as follows:

1. A vehicle load leveling system for maintaining an optimum level relationship between the front and rear of a vehicle by controlling the height relationship between the sprung mass and unsprung mass at the rear of the vehicle, comprising a pair of main suspension springs, each of said springs adapted to be connected between the sprung and unsprung mass of a vehicle, a fluid pressure operator associated with each of said springs operative to control the length of said springs by imposing a simulated load thereon to maintain a desired height relationship between the sprung and unsprung mass, an air bleed conduit in communication with said operator, an air supply conduit in communication with said operator, means for connecting said bleed conduit to a vacuum source for reducing the pressure in said operator to cause it to compress said spring to a predetermined minimal height when the vehicle is at curb load, air control valve means including a flexible lever having a fixed end and a movable end, means for connecting the movable end between the sprung and unsprung mass, said supply conduit located between said movable end and fixed end to be pinched therebetween when the vehicle is leveled, said movable end moving from said supply conduit to open it when the vehicle is loaded to direct ambient air into the fluid actuator so as to reduce the vacuum therein when the vehicle is loaded thereby to allow the springs to expand from their minimal height position to support the added load and to maintain a predetermined height relationship between the sprung and unsprung mass of the vehicle.

2. A vehicle load leveling system for maintaining an optimum level relationship between the front and rear of a vehicle by controlling the height relationship between the sprung mass and unsprung mass at the rear of the vehicle, comprising a pair of main suspension springs, each of said springs adapted to be connected between the sprung and unsprung mass of a vehicle, a fluid pressure operator associated with each of said springs operative to control the length of said springs by imposing a simulated load thereon to maintain a desired height relationship between the sprung and unsprung mass, an air bleed conduit in communication with said operator, an air supply conduit in communication with said operator, maximum vacuum regulator valve means having an inlet connected to said air bleed conduit and an outlet adapted to be connected to a vacuum source for bleeding air through said bleed conduit to reduce the pressure in said operator to cause it to compress said spring to a predetermined minimal height when the vehicle is at curb load, means responsive to a predetermined pressure differential between atmosphere and operator pressure to prevent flow through said regulator valve to hold a predetermined pressure in the actuator for maintaining the spring in its minimal height position when the vehicle is at curb load, and air control valve means including a flexible lever having a first position against said supply conduit to pinch it closed and a second position spaced from said supply conduit to open it when the vehicle is loaded thereby to direct atmospheric air into the fluid operator so as to reduce the vacuum therein when the vehicle is loaded thereby to allow the springs to expand from their minimal height position to support the added load and to maintain a predetermined height relationship between the sprung and unsprung mass of the vehicle.

3. A vehicle leveling system comprising spring means adapted to be connected between the sprung and unsprung mass of a vehicle, pressure actuated means for controlling the length of said spring means to level the vehicle, a first and a second pressure supply, a first fluid conduit communicating said actuator with said first pressure supply to cause said pressure actuator to be conditioned to compress said spring to a minimal height relationship when the vehicle is unloaded, a second fluid conduit connected to said second pressure supply and to said actuator for changing the pressure in said actuator to permit said spring to extend from its minimal height position, a height responsive operator for selectively opening and closing said conduits including a first spring band overlying one of said conduits, a second spring band enclosed by said first band including an elongated flexible lever extending therefrom, means for connecting said elongated lever between the sprung and unsprung mass of a vehicle for causing movement of said lever with respect to said first band, said lever having a first operative position when the vehicle is unloaded to cause it to close said second fluid conduit and to open said first fluid conduit to cause said actuator to compress said spring and to maintain it in its minimum height relationship to maintain a desired height relationship between the sprung and unsprung mass of a vehicle at curb load, said lever having a second operative position when the vehicle is loaded to cause it to close said first conduit between said lever and said first band and to open said second conduit to vary the pressure in said actuator to allow said spring to expand from its minimal height relationship to compensate for the additional load placed on said vehicle.

4. A vehicle leveling system comprising a pair of main suspension springs, each of said springs adapted to be connected between the sprung and unsprung mass of a vehicle, a bellows sleeve on each of said springs for compressing said springs when the vehicle is unloaded to maintain a desired height relationship between the sprung and unsprung masses, a supply and exhaust conduit leading to each of said bellows sleeve for directing fluid thereto and therefrom, first and second conduits connected to said supply and exhaust conduits for connecting said conduit to first and second pressure sources, means for controlling fluid flow through each of said first and second conduits including a pair of spaced apart flexible spring bands and a base member, one of said first and second conduits extending between said first and second bands, the other of said lines extending between said second spring band and said base member, said second band having an elongated extension therefrom, means for connecting said elongated extension between the sprung and unsprung mass to be moved between first and second operative positions, said elongated extension in its first operative position causing said second band to close said other line and causing said one line to be maintained opened between said first and second bands thereby to connect the supply and exhaust conduit to said bellows to only one of said pressure sources to maintain said springs at a minimal height relationship when the vehicle is unloaded, said extension having a second operative position wherein said other line is maintained open between said base member and second band and wherein said one line is closed by the first and second spring bands to connect the bellows sleeve to the second pressure source to change the pressure therein to allow the main springs to carry the additional vehicle load thereby to maintain the desired height relationship between the sprung and unsprung mass when the vehicle is loaded.

5. In a vehicle leveling system of the type including a main spring and a vacuum actuator for controlling the extension of the main spring wherein the main spring is connected between the sprung and unsprung mass for maintaining a predetermined height relationship therebetween and wherein the vacuum actuator is controlled by being selectively connected to ambient air and to a vacuum source, the improvement comprising; a maximum vacuum valve controller including a valve body having an inlet adapted to be connected to a conduit connected to the vacuum bellows and an outlet adapted to be connected to a vacuum source, said valve body including a bore at one end thereof having a ball check valve therein, a passageway through said body closed by said ball in the absence of vacuum in the vacuum source, said passageway communicating with side openings in the valve body, means including a flexible sleeve connected to said valve body in surrounding relationship therewith to overlie said side openings to form a fluid flow chamber, said passageway, said side openings and chamber defining a flow path between said inlet and outlet, said flexible sleeve being responsive to a maximum vacuum condition within said chamber to be pressed by atmospheric air outwardly of said sleeve into engagement with said housing to close said side openings thereby to disconnect the vacuum actuator from the vacuum source upon the occurrence of a predetermined maximum vacuum within said actuator to cause it to maintain said springs at a minimum height.

6. A vehicle leveling system controller for controlling flow from first and second pressure sources into a supply conduit of a fluid pressurized variable volume chamber of a load leveler device adapted to be connected between the sprung and unsprung mass of a vehicle for maintaining a predetermined height relationship therebetween comprising; a first conduit adapted to be connected to a first pressure source; a second conduit adapted to be connected to a second pressure source, means for connecting one end of each of said conduits to the variable volume chamber, the other end of one of said conduits being connected to atmosphere, the other of said conduits adapted to be connected to a source of vacuum, a fixed member adapted to be connected to one of the mass portions of a vehicle, first and second spring bands fixedly secured to said fixed member, one of said bands including a loop portion thereon with an elongated extension, the other of said bands having a loop portion outwardly of and in surrounding relationship to the loop portion of said first band including an end portion thereon, the end portion and the extension being located on either side of said conduit connected to the vacuum source, the other of said conduit being located between said extension and said fixed member, means for connecting said extension to the other of said masses, said extension selectively opening and closing said conduits upon relative movement between the sprung and unsprung mass, said extension having a first position when the vehicle is level and a second position when the vehicle is loaded, said extension holding said one conduit closed against the fixed member when in its first position, said extension opening said one conduit and closing said other conduit between the extension and the band end portion when the vehicle is loaded, said opening and closing of said tubes controlling the amount of pressure within said vacuum actuators to maintain the spring at a minimum height relationship when the vehicle is unloaded and to reduce the vacuum in the bellows when the vehicle is loaded to permit the spring to carry the additional vehicle load so as to maintain a desired height relationship between the sprung and unsprung mass of a vehicle.

* * * * *

PO-1050
(5/69)

UNITED STATES PATENT OFFICE
CERTIFICATE OF CORRECTION

Patent No. 3,768,820          Dated October 30, 1973

Inventor(s) Ming-Chih Yew

It is certified that error appears in the above-identified patent and that said Letters Patent are hereby corrected as shown below:

Column 3, line 58, -- seated -- should be inserted after "sealed".

Column 9, lines 15 and 16, "conduit" should be -- conduits --.

Signed and sealed this 17th day of December 1974.

(SEAL)
Attest:

McCOY M. GIBSON JR.
Attesting Officer

C. MARSHALL DANN
Commissioner of Patents